(12) United States Patent
Bethge et al.

(10) Patent No.: US 11,610,351 B2
(45) Date of Patent: Mar. 21, 2023

(54) METHOD AND DEVICE FOR IMAGE SYNTHESIS

(71) Applicant: EBERHARD KARLS UNIVERSITAET TUEBINGEN, Tübingen (DE)

(72) Inventors: Matthias Bethge, Tübingen (DE); Leon Gatys, Tübingen (DE)

(73) Assignee: EBERHARD KARLS UNIVERSITAET TUEBINGEN, Tübingen (DE)

( * ) Notice: Subject to any disclaimer, the term of this patent is extended or adjusted under 35 U.S.C. 154(b) by 286 days.

(21) Appl. No.: 15/880,750

(22) Filed: Jan. 26, 2018

(65) Prior Publication Data

US 2018/0158224 A1    Jun. 7, 2018

Related U.S. Application Data

(63) Continuation of application No. PCT/EP2016/068206, filed on Jul. 29, 2016.

(30) Foreign Application Priority Data

Jul. 31, 2015    (DE) .......................... 102015009981.7

(51) Int. Cl.
| | |
|---|---|
| *G06T 11/60* | (2006.01) |
| *G06T 11/00* | (2006.01) |
| *G06V 10/44* | (2022.01) |
| *G06V 30/194* | (2022.01) |
| *G06T 7/41* | (2017.01) |

(52) U.S. Cl.
CPC ................ *G06T 11/60* (2013.01); *G06T 7/41* (2017.01); *G06T 11/001* (2013.01); *G06V 10/44* (2022.01); *G06V 30/194* (2022.01); *G06T 2207/20048* (2013.01)

(58) Field of Classification Search
CPC . G06T 11/001; G06T 7/40; G06T 7/41; G06T 7/42; G06T 7/44; G06T 7/45; G06T 2207/20048; G06T 11/60; G06K 9/66; G06K 9/4604
USPC .......................................... 382/162, 190, 284
See application file for complete search history.

(56) References Cited

U.S. PATENT DOCUMENTS

2003/0076334 A1*  4/2003  Dumitras .................. G06T 7/40
                                                       345/582

OTHER PUBLICATIONS

"Mean Filter." Hypermedia Image Processing Reference (HIPR2). homepages.inf.ed.ac.uk/rbf/HIPR2/mean.htm. Accessed Jun. 4, 2004. (Year: 2004).*

(Continued)

*Primary Examiner* — John B Strege
(74) *Attorney, Agent, or Firm* — Siritzky Law, PLLC

(57) ABSTRACT

Computer-implemented method for transferring style features from at least one source image to a target image, comprising the steps of generating a result image, based on the source and the target image, wherein one or more spatially-variant features of the result image correspond to one or more spatially variant features of the target image; and wherein a texture of the result image corresponds to a texture of the source image; and outputting the result image, and a corresponding device. According to the invention, the texture corresponds to a summary statistic of spatially variant features of the source image.

9 Claims, 4 Drawing Sheets

(56) References Cited

OTHER PUBLICATIONS

Cimpoi, Mircea, Subhransu Maji, and Andrea Vedaldi. "Deep convolutional filter banks for texture recognition and segmentation." arXiv preprint arXiv:1411.6836v2 (2015). (Year: 2015).*
Portilia, Javier, and Eero P. Simoncelli. "A parametric texture model based on joint statistics of complex wavelet coefficients." International journal of computer vision 40.1 (2000): 49-70. (Year: 2000).*
Heeger, David J., and James R. Bergen. "Pyramid-based texture analysis/synthesis." Proceedings of the 22nd annual conference on Computer graphics and interactive techniques. ACM, 1995. (Year: 1995).*
Hertzmann, Aaron, et al. "Image analogies." Proceedings of the 28th annual conference on Computer graphics and interactive techniques. ACM, 2001. (Year: 2001).*
Zhang, Wei, et al. "Style transfer via image component analysis." IEEE Transactions on Multimedia 15.7 (2013): 1594-1601. (Year: 2013).*
Jing, Yongcheng, et al. "Neural style transfer: A review." IEEE transactions on visualization and computer graphics (2019). (Year: 2019).*
PCT, International Search Report for International Application No. PCT/EP2016/068206, dated Oct. 10, 2016. (3 pages).
PCT, Written Opinion of the International Searching Authority for International Application No. PCT/EP2016/068206, dated Sep. 26, 2016. (9 pages).
PCT, International Preliminary Report on Patentability for International Application No. PCT/EP2016/068206, dated Feb. 6, 2018. (10 pages).
Zheng, Wang et al., "Neural network-based Chinese ink-painting art style learning", Intelligent Computing and Intelligent Systems (ICIS), 2010 IEEE International Conference, p. 462-466 (Oct. 29, 2010) <10.1109/ICICISYS.2010.5658312>.
Neumann, Attila et al., "Color Style Transfer Techniques using Hue, Lightness and Saturation Histogram Matching", The Eurographics Association 2005, p. 111-122. (Jan. 1, 2005) <https://pdfs.semanticscholar.org/eb55/a884b2bc117480d2c376111ac70d610d83e1.pdf>.
Gatys, Leon A. et al., "Texture synthesis and the controlled generation of natural stimuli using convolutional neural networks". (May 27, 2015) <https://pdfs.semanticscholar.org/ecef/28ddfcacf4f2ba9c22a3c8296d4e19322d3d.pdf>.
Gatys, Leon A. et al., "A Neural Algorithm of Artistic Style." (Aug. 26, 2015) <http://arxiv.org/pdf/1508.06576v2.pdf>.
Gatys, Leon A. et al., "Image Style Transfer Using Convolutional Neural Networks", p. 2414-2423. (Jun. 26, 2016) <http://www.cv-foundation.org/openaccess/content_cvpr_2016/papersGatys_Image_Style_Transfer_CVPR_2016_paper.pdf>.
EPO, Dec. 3, 2021, Communication about intention to grant a European patent, in European Patent Application 16748287.6 (5 pgs.).
EPO, Dec. 3, 2021, Text intended for grant, in European Patent Application 16748287.6 (16 pgs.).
EPO, Dec. 3, 2021, Text intended for grant (clean copy), in European Patent Application 16748287.6 (16 pgs.).
EPO, Oct. 19, 2021, Amended description with annotations, in European Patent Application 16748287.6 (2 pgs.).
EPO, Oct. 19, 2021, Claims, in European Patent Application 16748287.6 (2 pg.).
EPO, Oct. 19, 2021, Description, in European Patent Application 16748287.6 (1 pg.).
EPO, Oct. 19, 2021, Letter accompanying subsequently filed items, in European Patent Application 16748287.6 (1 pg.).
EPO, Oct. 19, 2021, Reply to communication from the Examining Division, in European Patent Application 16748287.6 (2 pgs.).
EPO, Apr. 9, 2021, Annex to the communication, in European Patent Application 16748287.6 (4 pgs.).
EPO, Mar. 3, 2021, Amended claims with annotations, in European Patent Application 16748287.6 (4 pgs.).
EPO, Mar. 3, 2021, Claims, in European Patent Application 16748287.6 (4 pgs.).
EPO, Mar. 3, 2021, Letter accompanying subsequently filed items, in European Patent Application 16748287.6 (1 pg.).
EPO, Mar. 3, 2021, Reply to communication from the Examining Division, in European Patent Application 16748287.6 (4 pgs.).
EPO, Aug. 24, 2020, Annex to the communication, in European Patent Application 16748287.6 (4 pgs.).
EPO, Aug. 24, 2020, Communication from the Examining Division, in European Patent Application 16748287.6 (2 pgs.).
EPO, Jun. 2, 2020, Reply to communication from the Examining Division, in European Patent Application 16748287.6 (3 pgs.).
EPO, Nov. 19, 2019, Annex to the communication, in European Patent Application 16748287.6 (2 pgs.).
EPO, Nov. 19, 2019, Communication from the Examining Division, in European Patent Application 16748287.6 (2 pgs.).
EPO, Oct. 25, 2019, Letter accompanying subsequently filed items, in European Patent Application 16748287.6 (1 pg.).
EPO, Oct. 25, 2019, Reply to communication from the Examining Division, in European Patent Application 16748287.6 (2 pgs.).
EPO, Sep. 5, 2019, Annex to the communication, in European Patent Application 16748287.6 (1 pg.).
EPO, Aug. 19, 2019, Annex to the communication, in European Patent Application 16748287.6 (3 pgs.).
EPO, Aug. 19, 2019, Communication from the Examining Division, in European Patent Application 16748287.6 (2 pgs.).
EPO, Jul. 17, 2019, Letter accompanying subsequently filed items, in European Patent Application 16748287.6 (1 pg.).
EPO, Jul. 17, 2019, Reply to communication from the Examining Division, in European Patent Application 16748287.6 (5 pgs.).
EPO, Jan. 23, 2019, Annex to the communication, in European Patent Application 16748287.6 (2 pgs.).
EPO, Jan. 23, 2019, Communication from the Examining Division, in European Patent Application 16748287.6 (2 pgs.).
EPO, Jan. 9, 2019, Annex, in European Patent Application 16748287.6 (5 pgs.).

* cited by examiner

US 11,610,351 B2

METHOD AND DEVICE FOR IMAGE SYNTHESIS

CROSS-REFERENCE TO RELATED APPLICATIONS

This application is a National Phase Application of PCT International Application No. PCT/EP2016/068206, international filing date Jul. 29, 2016, entitled "METHOD AND DEVICE FOR IMAGE SYNTHESIS," published Feb. 9, 2017 as WO 2017/021322, claiming priority of German Patent Application No. 10 2015 009 981.7, filed Jul. 31, 2015, both of which are fully incorporated herein by reference in their entirety and for all purposes.

FIELD OF THE INVENTION

The invention relates to a method and a device for the synthesis of an image, in particular for the synthesis of an image, in which features of a source image, e.g. a texture, are transferred to a target image.

BRIEF DESCRIPTION OF THE SEVERAL VIEWS OF THE DRAWINGS

Objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

DESCRIPTION

Figure 1:
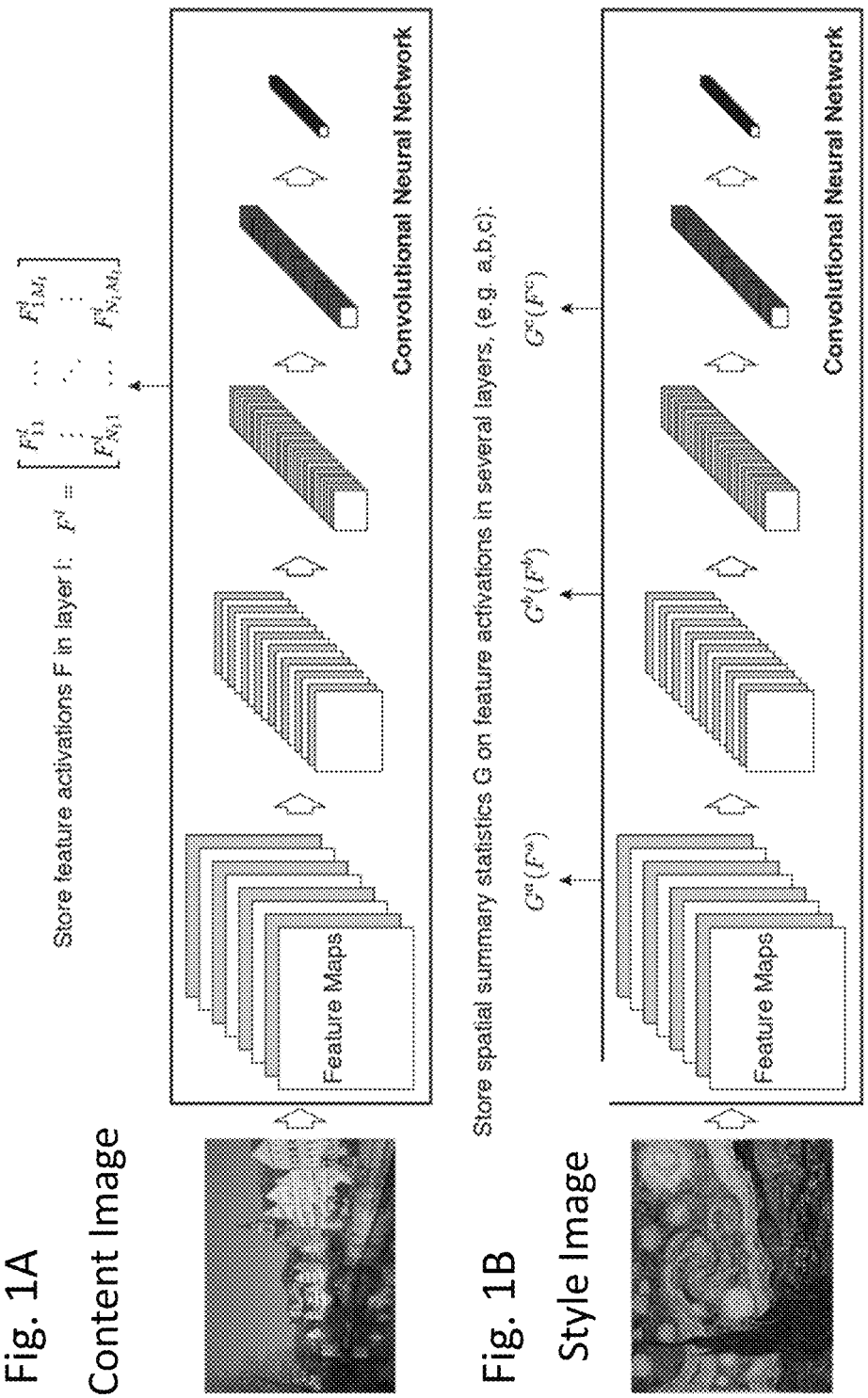
FIG. 1A shows an overview of a method for the extraction of content features according to an embodiment of the invention.
FIG. 1B shows schematically how a style representation is constructed according to the invention.

Methods for the transfer of a texture of a source image to objects of a target image are known in the prior art. Ashikhmin ("Fast Texture Transfer", IEEE Computer Graphics and Applications 23, 2003, 4, 38 to 43) shows a fast method working on the pixel level. The also pixel based method of Lee at al ("Directional Texture Transfer", NPAR 2010, 43 to 50) uses the gradient of the target image, e.g. for simulating the direction of brush strokes. Xie et al ("Feature Guided Synthesis for Artistic Style Transfer", DIMEA 2007, 44 to 49) show a method for transferring the texture characteristics of a source image to a target image, based on a feature map of basic statistical features generated from the target image. None of the cited methods equally takes local as well as global texture features of the source image equally into account. Moreover, the methods depend on fixed assumptions on the kind of texture. The parametric texture model for texture synthesis proposed by Portilla and Simoncelli (J. Portilla and E. P. Simoncelli. A Parametric Texture Model Based on Joint Statistics of Complex Wavelet Coefficients. International Journal of Computer Vision, 40(1):49-70, October 2000) is based on a set of carefully handcrafted summary statistics computed on the responses of a linear filter bank. Although the model shows very good performance in synthesizing a wide range of textures, it still fails to capture the full scope of natural textures.

It is therefore an object of the present invention to provide a general, flexible and efficient method and a device for image synthesis, in particular for transferring style features of a source image to a target image, which better reproduces the local and global texture features of the source image, without significantly impairing the identity of the objects of the target image.

This object is achieved by the methods and the device according to the independent claims. Advantageous embodiments of the invention are defined in the dependent claims.

In particular, the method according to the invention generates a result image, based on the source and the target image, wherein one or more spatially-variant features of the result image, i.e. the content of the image in terms of objects and their arrangement in the image, correspond to one or more spatially variant features, i.e. the content, of the target image, and wherein a texture of the result image corresponds to a texture of the source image. The texture corresponds to a summary statistic of spatially variant features of the source image, which is spatially invariant.

The method according to the invention is essentially based on the use of suitable non-linear transformations of the source image for the extraction of relevant features and the use of summary statistics for representing a texture of the source image. The non-linearity allows in particular, taking more complex features of the source image into account. The extracted features represent the image information such that semantic image information (e.g. objects) are simply (e.g. linearly) decodable, e.g. it can already be sufficiently described by a linear classifier, which ensures its efficient consideration during image synthesis in return. Thereby, the method according to the invention achieves altogether a high quality of the generated images at a relatively low cost. When the non-linear transformations are realized with a neural network, the method according to the invention further achieves a high generality and flexibility, as image features must not be hard coded or given, but can be learned from a set of training data.

FIG. 1A shows first an overview of a method for the extraction of content features according to an embodiment of the invention. The features of one or more digital source images are extracted with a "folding" neural network (convolutional neural network or CNN). CNN consist of layers of small computing units that process visual information hierarchically in a forward-processing manner Each layer of units can be understood according to the invention as a set of image filters, each of which extracts a particular feature of the input image. Therefore, the output of a given layer consists of so-called "feature maps", that is differently filtered versions of the input image. Typically, the number of feature maps increases in each layer along the processing hierarchy, but their spatial extent can be reduced by downsampling in order to achieve a reduction in the total number of units per layer. Because each layer defines a non-linear filter operation on the output of the previous layer, layers higher up in the hierarchy extract increasingly complex features.

The CNN used in the present embodiment is trained in object recognition. In this case, the CNN develops a representation of the image, while making object information along the processing hierarchy increasingly explicit [Leon A. Gatys, Alexander S. Ecker, and Matthias Bethge. Texture synthesis and the controlled generation of natural stimuli using convolutional neural networks. arXiv: 1505.07376 [cs, q-bio], May 2015. arXiv: 1505.07376]. In each layer of the network, the input image is represented by a set of feature maps in this layer. More specifically, when Convolutional Neural Networks are trained on object recognition, they develop a representation of the image that makes object information or so-called spatially variant features of the image increasingly explicit along the processing hierarchy. Therefore, along the processing hierarchy of the network, the input image is transformed into representations that are increasingly sensitive to the actual content of the image, but become relatively invariant to its precise appearance. Thus, higher layers in the network capture the high-level content in terms of objects and their arrangement in the input image but do not constrain the exact pixel values of the reconstruction very much. In contrast, reconstructions from the lower layers simply reproduce the exact pixel values of the original image. Therefore, the feature responses in higher layers of the network may be referred to as the content representation.

This information on the image contained in each layer can be visualized directly by reconstruction of the image exclusively from these feature maps [Aravindh Mahendran and Andrea Vedaldi. Understanding Deep Image Representations by Inverting Theme. arXiv: 1412.0035 [cs], November 2014. arXiv: 1412.0035]. Reconstructions of the lower layers are almost perfect, while reconstructions from higher layers reproduce the exact pixel values of the original image less accurately while they further capture its contents. A certain loss of information is to be expected when the total number of units representing the image, decreases with increasing layers. Because the network is trained in the recognition of objects, its filters are optimized also to reshape the input image into a representation, in which object information is made explicit. Therefore, the input image is transformed along the processing hierarchy of the network into a representation that increasingly represent the semantic content of the image explicitly, compared with its detailed pixel values.

The results according to the embodiment of the invention, were obtained based on the freely available VGG network [Karen Simonyan and Andrew Zisserman. Very Deep Convolutional Networks for Large-Scale Image Recognition. arXiv: 1409.1556; Yangqing Jia, Evan Shell Hamer, Jeff Donahue, Sergey Garayev, Jonathan Long, Ross Girshick, Sergio Guadarrama, and Trevor Darrell. Caffe: Convolutional architecture for fast feature embedding. In Proceedings of the ACM International Conference on Multimedia, pages 675-678. ACM, 2014], which the inventors have suitably modified. In particular, the feature space is used which is provided by the 16 folding and 5 of the pooling layers 19 VGG-layer network. None of the fully connected layers was used. For image synthesis, the max pooling operation in the known network is according to the invention replaced by an average pooling operation, which improves the gradient flow and better image results.

In general, each layer in the network defines a non-linear filter bank whose complexity increases with the position of the layer in the network. Therefore, a given input image x in each layer of the CNN will be encoded by filter responses to this image. A layer with N1 different filters has N1 feature maps of size M1, where M1 is the height times the width of the feature maps. So the answers in a layer 1 may be stored in a matrix F1 element R, where Fij is the activation of the ith filter at position j in layer 1.

FIG. 1B shows schematically, how a style representation is constructed according to the invention, on the responses of the CNN in every layer of the network, by calculating a correlation between different filter responses, wherein the expectation is taken over the spatial extent of the input image. This feature correlation is given in the present case by the Gram matrix G, where G is the inner product between the vectored feature map i and j in layer 1:

$$G_{ij}^l = \sum_k F_{ik}^l F_{jk}^l$$

By adding the feature correlation of multiple layers, a stationary multi-scale representation of the source image is obtained which captures the texture information of the image, but not the global arrangement. In summary, from the layers of the network two feature spaces are formed, which hold information about the content and the style of a given source image. First, the activation of units in the higher layers of the neural network captures mainly the content of the source image without capture detailed pixel information. Then, the correlations between different filter responses in a number of layers in the network capture the style information of a given source image. This style or texture representation ignores the global configuration of the source image, but preserves the overall appearance in terms of color and local image structures.

The invention thus allows representing the content and style of an image separated from each other. Thereby, content and style can also be manipulated independently. This allows in particular the generation of new images, which combine the contents of any photographs with the appearance of various works of art.

Figure 2:
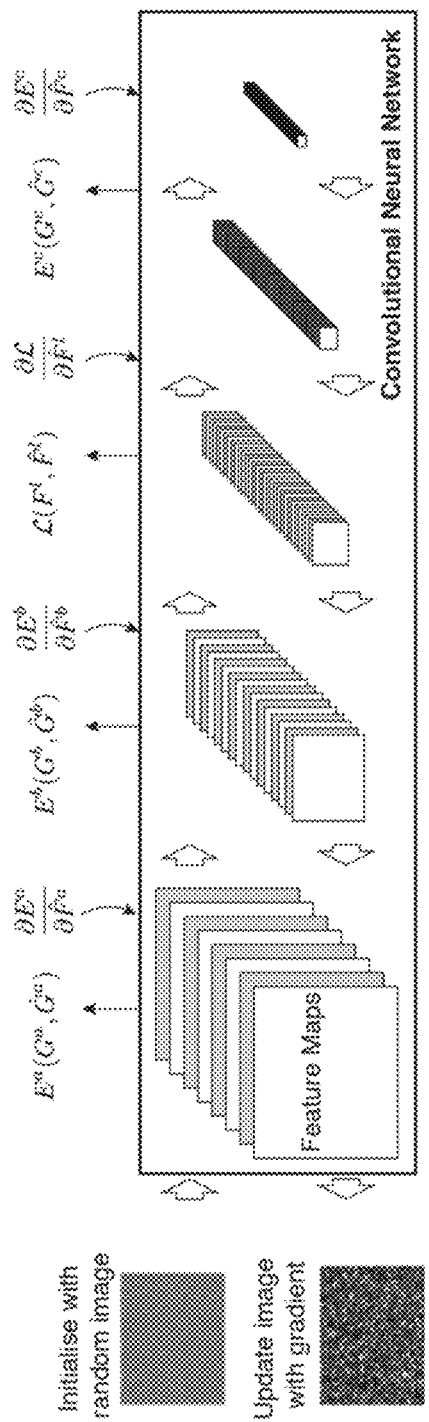
FIG. 2 shows an overview of a method for generating an image according to an embodiment of the invention.

FIG. 2 shows an overview of a method for generating an image according to an embodiment of the invention.

To produce an image that mixes the contents of a target image, such as a photograph with the style of a source image, such as a painted picture, an image search can be performed, which is initialized with an appropriate start image, for example, a random image whose brightness values are distributed according to white noise, or the source image or the target image as initial image. Thereby, the distance of a content and a style representation of the initial image from a content representation of the target image in a layer of the network and the style representation of the source image in a number of layers of the neural network are minimized jointly.

The respective distance between content and stylistic characteristics of the original image and the target or source image can be expressed by means of appropriate loss functions $L_{content}$ and $L_{style}$. If the photograph is $\vec{p}$ and the artwork is $\vec{a}$ the total loss function that is to be minimized is then:

$$L_{total}(\vec{p},\vec{a},\vec{x}) = \alpha L_{content}(\vec{p},\vec{x}) + \beta L_{style}(\vec{a},\vec{x})$$

where $\alpha$ and $\beta$ are weighting factors respectively. The weighting factors are preferably continuously adjustable, for example via a controller as part of a graphical user interface of a software that implements the inventive method. According to one embodiment of the invention, further loss terms may be included in the loss function to control other features of the generated image.

A stronger emphasis on style results in images corresponding to the appearance of the artwork without showing essential content of the target image, i.e. the photograph. With stronger emphasis on the content, the photograph can be identified more clearly, but the style has correspondence to the one of the source image.

Figure 3:
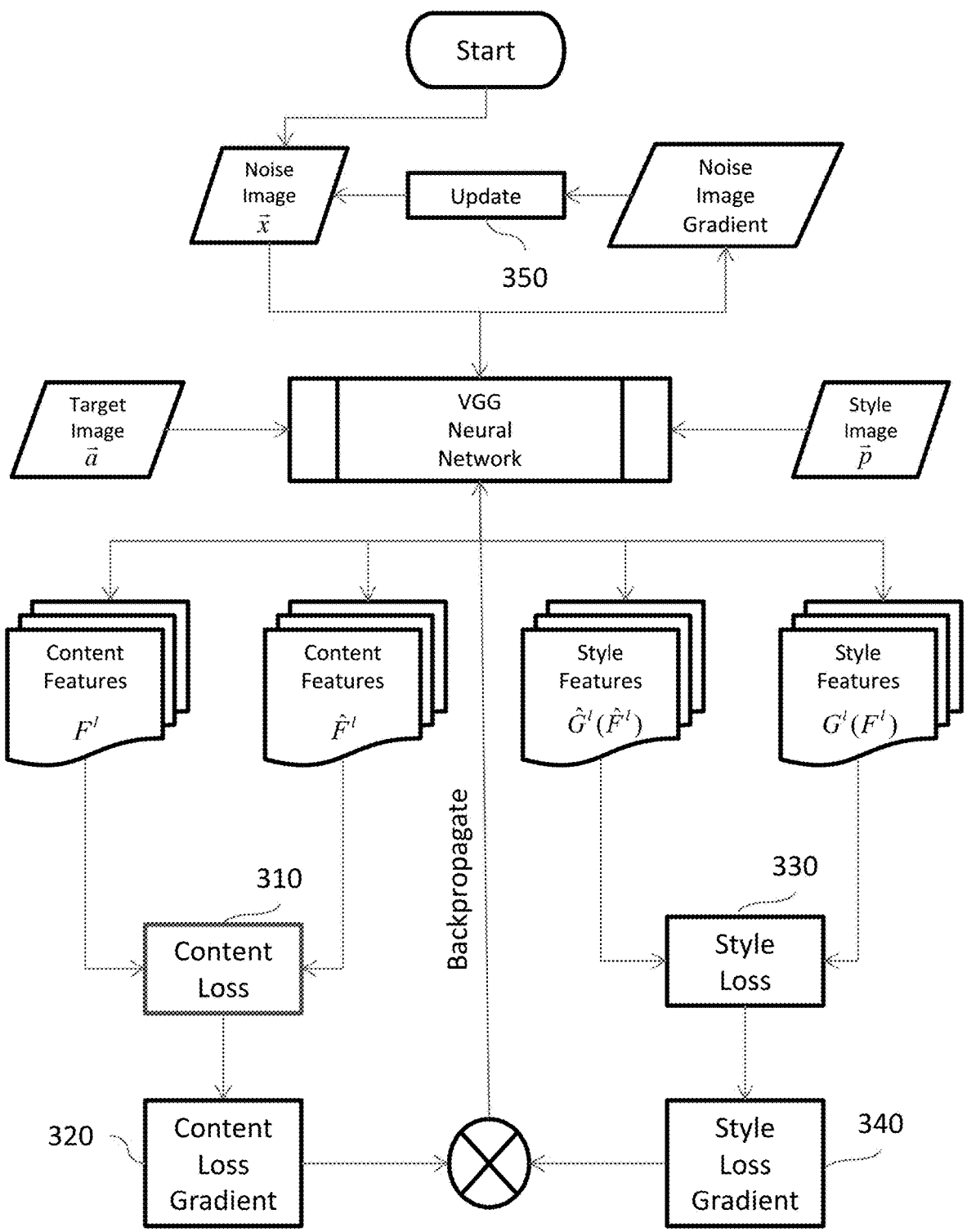
FIG. 3 shows a schematic representation of a method for synthesizing an image based on the extracted features according to an embodiment of the invention.

FIG. 3 shows a schematic representation of a method for synthesizing an image based on the extracted features according to an embodiment of the invention. A random image whose brightness values are distributed according to a white noise is used as input for the neural network to obtain feature activation $\hat{F}$ in the layers L, a, b, c. Then, summary statistics $\hat{G}$ are calculated for the layers a, b, and c. In a further step, a loss function L is calculated, the layers L, a, b and c. The loss for the target image in layer l is of the form $$L_{content}(\hat{F}^l, F^l) = \frac{1}{2}\sum_{i,j}(\hat{F}^l_{ij} - F^l_{ij})^2.$$

The loss of the source image in layer a, b, c is of the form $$E^a(\hat{G}^a, G^a) = \frac{1}{4N_a^2 M_a^2}\sum_{i,j}(\hat{G}^a_{ij} - G^a_{ij})^2.$$

Thereafter, the gradient of the loss is calculated in each layer with respect to the feature activation F in this layer. The gradient of the target image in layer l is of the form $$\frac{\partial L_{content}}{\partial F^l_{ij}} = \begin{cases} (\hat{F}^l - F^l)_{ij} & \text{if } \hat{F}^l_{ij} > 0 \\ 0 & \text{if } \hat{F}^l_{ij} < 0 \end{cases}.$$

The gradient of the source image in layers a, b, c is of the form $$\frac{\partial E_a}{\partial \hat{F}^a_{ij}} = \begin{cases} \frac{1}{N_a^2 M_a^2}((\hat{F}^a)^T(\hat{G}^a - G^a))_{ji} & \text{if } \hat{F}^a_{ij} > 0 \\ 0 & \text{if } \hat{F}^a_{ij} < 0 \end{cases}.$$

Then, the gradient is propagated by error back propagation back through the network and the gradient with respect to the white noise image is calculated.

Thereafter, the white noise image is adjusted, to minimize loss in layers l, a, b.

This process is continued with the adjusted image, until the loss satisfies an appropriate termination criterion, for example, is sufficiently small. Alternatively, the method may use the source or the target image as an initial image.

In another embodiment of the invention, the explicit and substantially separate representation from the content of the style of an image may serve as a basis for a method of style classification and assigning of works of art to a particular artist. Thereby, the transformation of the source image to be identified into a stationary feature space, such as the style representation according to the invention, ensures a higher degree of efficiency than conventional approaches in which classifiers work directly on the primary network activations.

Figure 4A:
FIGS. 4A-4F show images which combine the content of a photograph with the style of various well-known artworks, according to exemplary embodiments hereof.
Figure 4B:
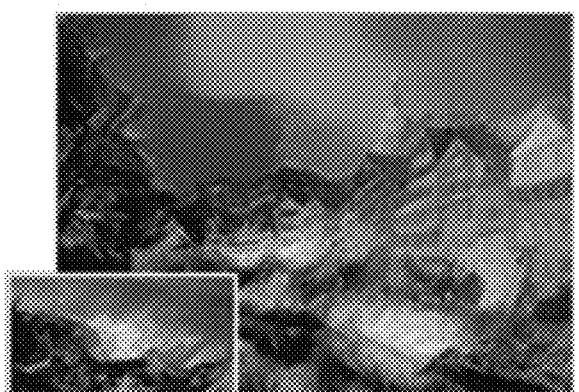
Figure 4C:
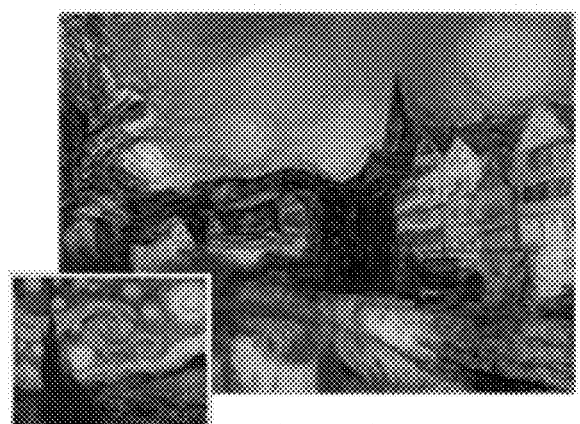
Figure 4D:
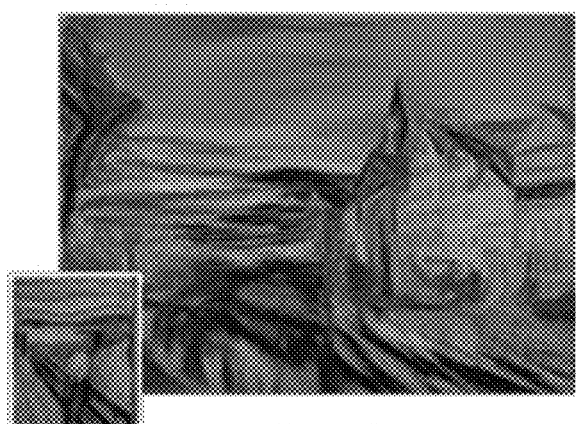
Figure 4E:
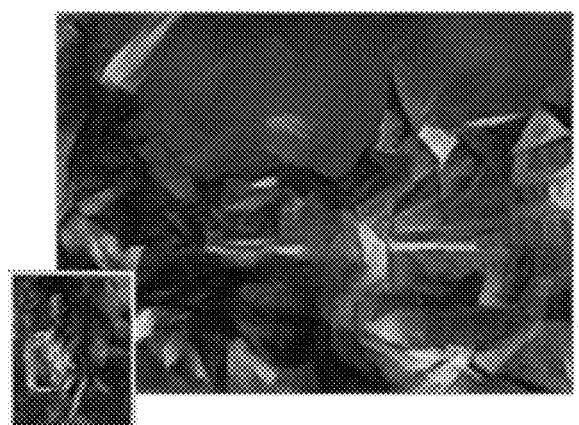
Figure 4F:
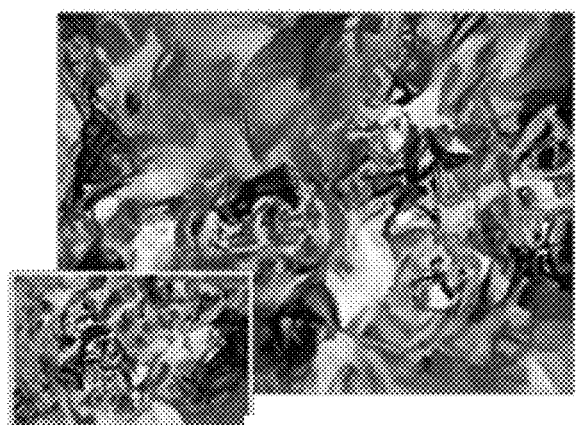

FIGS. 4A-4F shows images, which combine the content of a photograph with the style of various well-known artworks. The images were generated according to the invention by searching an image that simultaneously fits the content representation of a photograph and the style representation of the artwork. The original photograph shows the Neckarfront in Tübingen, Germany, and is shown in FIG. 4A. The painting, which has provided the style for each generated image is shown in the lower left corner of each panel. In FIG. 4B, the painting "The Shipwreck of the Minotaur" by J. M. W. Turner, 1805 was used. In the image in FIG. 4C, the "Starry Night" by Vincent van Gogh, 1889 was used. In FIG. 4D "The Scream" by Edvard Munch, 1893, was used. In FIG. 4E, the "naked sitting woman" by Pablo Picasso was used, and image in FIG. 4F the "Composition VII" by Wassily Kandinsky from 1913, was used.

In the images shown in FIGS. 4A-4F a style of representation was used which comprised layers of the entire network hierarchy. Alternatively, style also be defined locally, in which only a smaller number of lower layers is used, resulting in different visual impressions. When the style representations are matched up to higher layers in the network, local image structures are adjusted on an increasingly larger scale, resulting in a visually more continuous impression. Therefore, the most visually appealing images are usually achieved by matching the style representation up to the highest layers in the network.

IMPLEMENTATION

The methods according to the invention may be implemented on a computer, especially on a graphics card or a smartphone.

Example embodiments may also include computer program products. The computer program products may be stored on computer-readable media for carrying or having computer-executable instructions or data structures. Such computer-readable media may be any available media that can be accessed by a general purpose or special purpose computer. By way of example, such computer-readable media may include RAM, ROM, EPROM, EEPROM, CD-ROM or other optical disk storage, magnetic disk storage or other magnetic storage devices, or any other medium that may be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is an example of a computer-readable medium. Combinations of the above are also to be included within the scope of computer readable media. Computer-executable instructions include, for example, instructions and data, which cause a general-purpose computer, a special purpose computer, or a special purpose processing device to perform a certain function or group of functions. Furthermore, computer-executable instructions include, for example, instructions that have to be processed by a computer to transform the instructions into a format that is executable by a computer. The computer-executable instructions may be in a source format that is compiled or interpreted to obtain the instructions in the executable format. When the computer-executable instructions are transformed, a first computer may for example transform the computer executable instructions into the executable format and a second computer may execute the transformed instructions.

The computer-executable instructions may be organized in a modular way so that a part of the instructions may belong to one module and a further part of the instructions may belong to a further module. However, the differences between different modules may not be obvious and instructions of different modules may be intertwined.

Example embodiments have been described in the general context of method operations, which may be implemented in one embodiment by a computer program product including computer-executable instructions, such as program code, executed by computers in networked environments. Generally, program modules include for example routines, programs, apps for smartphones, objects, components, or data structures that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such operations.

Some embodiments may be operated in a networked environment using logical connections to one or more remote computers having processors. Logical connections may include for example a local area network (LAN) and a wide area network (WAN). The examples are presented here by way of example and not limitation.

Such networking environments are commonplace in office-wide or enterprise-wide computer networks, intranets and the Internet. Those skilled in the art will appreciate that such network computing environments will typically encompass many types of computer system configurations, including personal computers, hand-held devices like mobile phones, multiprocessor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions might include a general-purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer readable media provide nonvolatile storage of computer executable instructions, data structures, program modules and other data for the computer.

Software and web implementations could be accomplished with standard programming techniques with rule-based logic and other logic to accomplish the various database searching steps, correlation steps, comparison steps and decision steps. The words "component" and "section" as used herein and in the claims is intended to encompass implementations using one or more lines of software code, hardware implementations, or equipment for receiving manual inputs.

We claim:

1. A computer-implemented method for transferring style features from at least one source image to a target image, the method comprising:
   (A) generating a result image, based on the source image and the target image, by constructing a style representation of the source image based on filter responses of a convolutional neural network to the source image in a number of layers of the network, and by calculating a correlation between the different filter responses,
       wherein an expectation is taken over the spatial extent of the source image, and
       wherein semantic content of the result image corresponds to semantic content of the target image, and
       wherein a texture of the result image corresponds to a texture of the source image; and
   (B) outputting the result image.

2. The method of claim 1, wherein the correlation corresponds to a Gram matrix.

3. The method of claim 1, wherein the semantic content of an image corresponds to a result of a non-linear transformation of that image.

4. The method of claim 3, wherein the non-linear transformation corresponds to one or more convolutions of the image.

5. The method according to claim 1, characterized in that the result image is made available in a social network.

6. The method according to claim 1, wherein the target image is received from a user or wherein the result image is sent to a user over a telecommunications network.

7. A non-transitory computer program product comprising software comprising instructions for performing a method according to claim 1 on a computer.

8. A device for transferring style features from at least one source image to a target image, the device comprising:
   (A) a generating section for generating a result image based on the target image and the source image,
       by constructing a style representation of the source image based on filter responses of a convolutional neural network to the source image in a number of layers of the network, by calculating a correlation between the different filter responses,
   wherein an expectation is taken over the spatial extent of the source image,
   wherein semantic content of the result image corresponds to semantic content of the target image, and
   wherein a texture of the result image corresponds to a texture of the source image; and
   (B) an output unit for outputting the result image.

9. The device of claim 8, further comprising a digital camera for capturing one or more source images.

* * * * *